United States Patent
Raithel et al.

(10) Patent No.: US 11,027,466 B2
(45) Date of Patent: Jun. 8, 2021

(54) PROCESS FOR PRODUCING FOAM MOLDED PARTS WITH AESTHETIC SURFACES BY FOAM INJECTION MOLDING

(71) Applicant: INEOS STYROLUTION GROUP GMBH, Frankfurt am Main (DE)

(72) Inventors: Bastian Raithel, Bayreuth (DE);
Norbert Niessner, Friedelsheim (DE);
Achim Bernhardt, Hainburg (DE);
Stefan Roettel, Gummersbach (DE);
Pierre Juan, Frankfurt am Main (DE);
Andreas Popp, Speichersdorf (DE)

(73) Assignee: INEOS STYROLUTION GROUP GMBH, Frankfurt am Main (DE)

(*) Notice: Subject to any disclaimer, the term of this patent is extended or adjusted under 35 U.S.C. 154(b) by 395 days.

(21) Appl. No.: 16/061,922

(22) PCT Filed: Dec. 13, 2016

(86) PCT No.: PCT/EP2016/080850
§ 371 (c)(1),
(2) Date: Jun. 13, 2018

(87) PCT Pub. No.: WO2017/102762
PCT Pub. Date: Jun. 22, 2017

(65) Prior Publication Data
US 2020/0262111 A1    Aug. 20, 2020

(30) Foreign Application Priority Data
Dec. 17, 2015  (EP) ................... 15200936

(51) Int. Cl.
*B29C 44/42*    (2006.01)
*B29C 44/34*    (2006.01)
(Continued)

(52) U.S. Cl.
CPC ........ *B29C 44/3446* (2013.01); *B29C 44/348* (2013.01); *B29C 44/3415* (2013.01);
(Continued)

(58) Field of Classification Search
CPC ...... C08J 9/0061; B29C 44/02; B29C 44/348; B29C 44/3415; B29C 44/18; B29C 44/42–428; B29C 44/3446
See application file for complete search history.

(56) References Cited

U.S. PATENT DOCUMENTS 3,983,196 A   9/1976  Gray
4,224,419 A   9/1980  Swoboda et al.
(Continued)

FOREIGN PATENT DOCUMENTS

CN   102658620 A   9/2012
DE     2826925 A1  1/1980
(Continued)

OTHER PUBLICATIONS

Translation of WO 0200745 by Barghoorn et al. (Year: 2002).*
(Continued)

*Primary Examiner* — Michael M Dollinger
*Assistant Examiner* — Christina H. W. Rosebach
(74) *Attorney, Agent, or Firm* — J.A. Lindeman & Co. PLLC (57) ABSTRACT

The invention relates to a process for producing a foam molded part, wherein a foamable material S comprising a thermoplastic polymer matrix M and at least one foaming agent F is foamed by foam injection molding. The polymer matrix M is preferably based on at least one thermoplastic styrene copolymer, such as ABS and ASA, and wherein the at least one foaming agent F is selected from chemical foaming agents, releasing carbon dioxide, and physical foaming agents, being carbon dioxide or nitrogen.

13 Claims, 3 Drawing Sheets

(51) Int. Cl.
*C08L 55/02* (2006.01)
*B29K 55/02* (2006.01)

(52) U.S. Cl.
CPC .............. *B29C 44/42* (2013.01); *C08L 55/02* (2013.01); *B29K 2055/02* (2013.01)

(56) References Cited

U.S. PATENT DOCUMENTS

| | | | |
|---|---|---|---|
| 5,314,925 A | | 5/1994 | Burnell et al. |
| 5,760,134 A | | 6/1998 | Guntherberg et al. |
| 6,323,279 B1 | | 11/2001 | Guntherberg et al. |
| 6,579,937 B1 | | 6/2003 | Guntherberg et al. |
| 2003/0017325 A1 | * | 1/2003 | Akimoto ............... B29C 44/086 428/318.4 |
| 2003/0181583 A1 | | 9/2003 | Duijzings et al. |
| 2009/0246471 A1 | * | 10/2009 | Zawacki ............. B29C 44/3469 428/157 |
| 2012/0061870 A1 | * | 3/2012 | Dougherty, Jr. ......... C08J 9/122 264/53 |

FOREIGN PATENT DOCUMENTS

| | | | |
|---|---|---|---|
| DE | 10142349 A1 | 3/2003 | |
| EP | 0022200 A1 | 1/1981 | |
| JP | 2010254833 A | 11/2010 | |
| TW | 200846163 A | 12/2008 | |
| WO | WO-0200745 A1 * | 1/2002 | .............. C08L 51/04 |
| WO | 2002/010222 A1 | 2/2002 | |
| WO | 2015/162242 A1 | 10/2015 | |

OTHER PUBLICATIONS

Eckardt, H.; Alex, K. "Structural and Coinjection Foam Molding". Advances in plastics technology, Apr. 1981. pp. 40-49. (Year: 1981).*
Translation of JP 2010254833 by Maeda et al. (Year: 2010).*
Machine Translation of CN 102658620A, publication date Sep. 12, 2012.
Machine Translation of JP 2010254833A, publication date Nov. 11, 2010.
"Plastic Additives Handbook", Ed. Gachter and Muller, 4th Edition, 1996; the relevance of which is discussed at page 7, lines 12-14 of the specification.

* cited by examiner

PROCESS FOR PRODUCING FOAM MOLDED PARTS WITH AESTHETIC SURFACES BY FOAM INJECTION MOLDING

The invention relates to a process for producing foam molded parts, wherein a foamable material S comprising a thermoplastic polymer matrix M and at least one foaming agent F is foamed by foam injection molding. The polymer matrix M is preferably based on at least one thermoplastic styrene copolymer, such as ABS, ASA, or blends thereof, and wherein the at least one foaming agent F is selected from chemical foaming agents, releasing carbon dioxide, and physical foaming agents, being carbon dioxide or nitrogen.

Typically, thermoplastic foam injection molding is a process wherein a foaming agent, usually a chemical or physical foaming agent, is introduced into a polymer melt, and after the injection in an extrusion or injection molding the foamable composition expands, e.g. in a mold cavity. Normally, a thermoplastic foam injection molding process leads to the formation of an integral foam structure encompassing a foamed core and a compact skin layer.

Polymer foams are used in many fields of industry. Owing to their advantageous properties such as low density, low thermal and acoustic conductivity and the ability to be processed essentially without residual stresses, they are of great industrial importance. They are used, for example, as industrial molding, as thermal insulation and acoustic insulation material, e.g. in the building sector and vehicle sector, or as packaging and padding material. In particular, due to the low density of foams, the use of polymer foams is of importance in automobile construction, in particular in bodywork construction. However, the pore structure of the foam often has an adverse effect on the mechanical strength of the components.

Generally, foams or foam materials are described as mixtures in which gas-filled voids (bubbles) are finely dispersed in a liquid or solid matrix material. In principle, all polymers and various processes are suitable for producing foams.

Typically, foams can be subdivided on the basis of their cell (or pore) structure into open-cell (sponge-like), closed-cell and mixed-cell foams. In the case of open-cell foams, as a rule, the surrounding medium (e.g. air) can circulate freely between the individual cells. This is not possible in the case of closed-cell foams. If the foam comprises both, open and closed cells, it is referred to as having a mixed-cell structure. Integral foams, or also referred to as structural foams, generally have a light, cellular core and a compacted, closed external skin.

Various processes for producing foams are described in the prior art, with a distinction generally being able to be made between chemical, physical and mechanical foaming processes according to the way in which the gas is generated. A foaming process very generally comprises creation of materials having a foam structure, i.e. the formation of a pore or cell structure in the material concerned. Typically the production of polymer foams encompasses the following three main working steps:
 i) Provision of a liquid starting material, e.g. a thermoplastic polymer melt or a prepolymer,
 ii) Generation of gas bubbles in the liquid phase by means of mechanical, chemical or physical processes,
 iii) Solidification of the foam state, e.g. by cooling or finalization of polymerization.

Generally the polymeric starting material for the production of a polymer foam may be a thermoplastic polymer melt, which is then mixed with the foaming agent, foamed and cooled, or otherwise a prepolymer, which is brought in contact with the foaming agent and the polymerization is finalized together or after the foaming step, e.g. production of PU foams.

Several technical process for the production of thermoplastic foams are known to those skilled in the art, inter alia extrusion processes, thermoplastic foam injection molding processes (TFIM), MuCell® (Trexel Inc.) processes, Cellmould® (Wittmann Battenfeld GmbH & Co. KG (DE)) processes and reaction foam casting processes (RFC) or reaction foam injection molding processes (RIM).

Processes for thermoplastic foam injection molding are already known in the prior art. Typically, the thermoplastic foam injection molding process (TFIM) operates in principle like a conventional injection molding process, wherein a foaming agent, for example a chemical foaming agent, is added to the thermoplastic polymer. Normally, on exiting from the injection molding nozzle, foaming of the foamable material may occur simultaneously. For the banking-up pressure to be above the gas pressure of the foaming agent so as to prevent premature foaming of the melt in the barrel, a closure nozzle has to be used. Otherwise, it is possible to inject a foamable composition into the mold cavity (also referred to as tool) under pressure without foaming and afterwards by opening the mold partially and/or by reduction of pressure the foamable composition foams.

Typically, a skin layer forms against the inside surface of the mold cavity resulting in so called integral foams. The foam molded part is normally taking out from the mold cavity after solidification.

A further known foaming process is the so called MuCell® process which can be considered to be a modified foam injection molding process. Typically, in MuCell® process, an compressed inert inorganic gas, in particular nitrogen or carbon dioxide, is mixed with a thermoplastic polymer melt resulting in a supercritical liquid, wherein said inert gas is used as physical foaming agent. A process for the production of a polymer foam using an inert gas in super-critical state is for example described in DE-A 101 42 349. The MuCell® process was developed and patented by the company Trexel Inc. A further known physical foaming process is the so called Cellmould® process which was developed and patented by the company Wittmann Battenfeld GmbH & Co. KG (DE).

U.S. Pat. No. 3,983,196 describes a method of injection molding of structural foam, wherein a compression step is carried out after the formation of the foam product and of a film on the surface of the product, but before final setting of the foam product. For this purpose the volume of the mold cavity is reduced. Further, the machine for the production of the structural foam, in particular the mold cavity construction, is described in detail.

The document JP 2010-254833 describes a thermoplastic resin composition for foam molding, wherein the resin composition comprises a rubber-reinforced styrene based resin, optionally a styrene based resin, a polycarbonate resin and a chemical foaming agent. Further, said document describes a method for the production of a foam-molded product wherein the thermoplastic resin composition is filed in a cavity and foaming is effected by specific expansion of the volume of the cavity. The foam molded product should exhibit a fine foamed cell structure with unified sizes of foamed cells and excellent mechanical properties.

CN-A 102658620 is directed to method for the production of a foam molded plastic part. The injection molding process described in CN-A 102658620 encompasses a) heating the mold cavity before injection molding to achieve a certain heating temperature; b) closing the mold cavity and introducing high pressure gas to keep certain pressure in the mold cavity; c) injection a foam fusion plastic raw material into the mold cavity and finally obtaining the foam plastic part. The foam plastic part should exhibit improved surface quality, no defects of flow mark and uniform internal air holes.

The document TW 200846163 relates to an injection forming method and a device for foam plastic materials comprising the steps: infusing plastic material and gas into a chamber (mold cavity), melting the plastic material and mixing it with the gas to form a blended foam plastic; guiding the blended foam plastic into another chamber, pressuring the chamber with the blended foam plastic to perform injection forming and performing the injection molding process. The bubble size should be adjusted by pressure force. It is disadvantageous that this process needs the utilization of two champers and thus it is more complex.

Therefore, there is a need for a simple, inexpensive and versatile process, for an optimized process for producing foams. The process conditions should be adjusted so that foams with optimized properties can be obtained, such as optimized density reduction, improved surface quality and mechanical stability.

It has surprisingly been found that foams based on at least one thermoplastic styrene copolymer, such as ABS, ASA, ABS/PA blends, or ASA/PA blends, can advantageously be obtained in an injection foam molding process with optimized process conditions. In particular the melt temperature, the mold temperature, the injection speed and selection of foaming agent were optimized in view of maximal density reduction, minimal thickness of skin layer and good surface quality.

The present invention is directed to a process for producing a foam molded part by foam injection molding, which comprises the following steps:

a) providing a melt of a foamable material S comprising a thermoplastic polymer matrix M and at least one foaming agent F selected from chemical foaming agents releasing carbon dioxide and physical foaming agents selected from nitrogen and carbon dioxide,
wherein the thermoplastic polymer matrix M comprises at least one thermoplastic styrene copolymer P consisting of, based on P:
1.1 5-95% by weight of a copolymer A consisting of, based on A:
1.1.1 69-81% by weight, of one or more vinyl aromatic monomer(s) A1, preferably selected from styrene and substituted styrenes,
1.1.2 19-31% by weight, of one or more vinyl cyanide monomer(s) A2, preferably selected from acrylonitrile and methacrylonitrile,
1.1.3 0-12% by weight, of one or more unsaturated copolymerizable monomers A3 (different from A1 and A2);
1.2 5-60% by weight of a graft rubber B consisting of, based on B:
1.2.1 10-95% by weight of a graft base B1 comprising, based on B1:
1.2.1.1 80-100% by weight of one or more rubber type monomer(s) B11, such as butadiene, isoprene, or $C_1$-$C_{10}$ alkyl acrylate,
1.2.1.2 0-20% by weight of one or more polyfunctional crosslinking monomer(s) B12, such as divinylbenzene or allyl(meth)acrylate;
1.2.2 5-90% by weight of a graft shell B2 comprising, based on B2:
1.2.2.1 75-85% by weight of one or more vinyl aromatic monomer(s) B21, preferably selected from styrene and substituted styrenes,
1.2.2.2 15-25% by weight of one or more vinyl cyanide monomer(s) B22, preferably selected from acrylonitrile and methacrylonitrile,
1.2.2.3 0-10% by weight of one or more unsaturated copolymerizable monomers B23 (different from B21 and B22);
b) filling a mold cavity K with the melt of the foamable material S by injection;
c) foaming the foamable material S in the mold cavity K by reduction of pressure and/or increase in temperature;
d) taking out the foam molded part;
e) optionally further working of the foam molded part;
wherein the melt temperature is equal or higher than 240° C., preferably equal or higher than 255° C., more preferably equal or higher than 270° C.; also preferably, the melt temperature is in the range of 240° C. to 300° C., preferably in the range of 255° C. to 300° C., more preferably in the range of 265° C. to 290° C.;
and wherein the mold temperature is equal or higher than 50° C., preferably equal or higher than 70° C.; also preferably, the mold temperature is in the range of 50° C. to 150° C., preferably in the range of 70° C. to 120° C.

In terms of the present invention foams or foam molded part can be understood as being materials comprising gas-filled voids (bubbles) which are finely dispersed in a solid polymer matrix. Generally the foams and foam molded parts described in the present invention may exhibit open-cell and/or closed-cell structure(s). In particular the foams and foam molded parts described in the present invention may be integral foams (or called structural foams) which exhibit a light, cellular core structure and a compacted, closed external skin.

Foamable Material S

The foamable material S comprises a thermoplastic polymer matrix M, preferably selected from styrene copolymers, such as acrylonitrile-butadiene-styrene copolymers (ABS), acrylonitrile-styrene-acrylate copolymers (ASA) and/or said styrene copolymers and polyamides (ABS/PA), and at least one foaming agent F selected from chemical foaming agents releasing carbon dioxide and physical foaming agents selected from nitrogen and carbon dioxide.

In a preferred embodiment the thermoplastic polymer matrix M consisting of at least one polymer selected from acrylonitrile-butadiene-styrene copolymers (ABS), acrylonitrile-styrene-acrylate copolymers (ASA) and blends of said styrene copolymers with at least one further polymer component, preferably at least one polyamide (PA), e.g. ABS/PA or ASA/PA blends. The thermoplastic polymer matrix M is described in detail below.

Preferably the thermoplastic polymer matrix M represents the main component of the foamable material S. In particular, the foamable material S consists of the thermoplastic polymer matrix M and the at least one foaming agent F. The foamable material S generally comprises the thermoplastic polymer matrix M in an amount of more than 50% by weight, preferably more than 70% by weight, in particular more than 90% by weight (in each case based on the total weight of foamable material).

The foamable material S preferably comprises, preferably consists of, from 70 to 99.9% by weight, in particular from 90 to 99% by weight, particularly preferably from 95 to 99% by weight, of the thermoplastic polymer matrix M, and from 0.1 to 30% by weight, in particular from 1 to 10% by weight, particularly preferably from 1 to 5% by weight, of the at least one foaming agent F. The figures in % by weight are in each case based on the total weight of the foamable material.

However, the foamable material S used in the inventive process can also comprise further additives, such as customary ancillary and processing additives which are commonly known for the processing or modification of styrene copolymers. These further additives are usually added to polymers, in particular to foams, depending on the intended field of application. Typically the foamable material S comprises from 0 to 10% by weight, preferably from 0 to 5% by weight, in particular from 0 to 4% by weight, more preferably from 0.01 to 4% by weight of further additives, based on the total weight of the foamable material.

These further additives can be added into the material at any stage of the process, but preferably at an early juncture, in order to utilize an stabilizing effect or other specific effects at an early stage. With respect to further conventional auxiliaries and additives, reference is made by way of example to "Plastics Additives Handbook", Ed. Gächter and Müller, 4th edition, Hanser Publ., Munich, 1996. For example a reinforcing material as further additive, such as fibrous or particulate fillers, preferably glass fiber, can for example be mixed with the polymer matrix M, in particular with the melt of the polymer matrix M before filling of the cavity. Typically the amounts of fibrous or particulate fillers, e.g. glass fibers, are in the range from 0.05 to 15% by weight.

In particular the foamable material S comprises as further additive one or more additives selected from fillers, plasticizers, impact modifiers, dyes, pigments, colorants, flame retardants, antistatic agents, mold-release agents, antioxidants, stabilizers, and lubricants.

Examples that may be mentioned of fibrous or particulate fillers are carbon fibers or glass fibers in the form of glass wovens, glass mats, or glass silk rovings, chopped glass, or glass beads, or else wollastonite, particularly preferably carbon or glass fibers. If glass fibers are used, these may have been equipped with a size and with a coupling agent to improve compatibility with the components of the blend. The glass fibers incorporated can take the form either of short glass fibers or else of continuous-filament strands (rovings).

Examples of suitable particulate fillers are carbon black, amorphous silica, magnesium carbonate (chalk), powdered quartz, mica, bentonites, talc, kaolin or calcium silicates, such as wollastonite. Examples of suitable pigments are titanium dioxide, phthalocyanines, ultramarine blue, iron oxides, or carbon black, and also the entire class of organic pigments.

Common stabilizers for thermoplastic polymers, e.g. for foam molded parts, encompass stabilizers for improving thermal stability, which are commonly agents to counteract thermal decomposition, light stabilizers (stabilizers for increasing lightfastness), and stabilizers for raising resistance to hydrolysis and to chemicals. Examples of suitable light stabilizers are various substituted resorcinols, salicylates, benzotriazoles, and benzophenones. Examples of suitable stabilizers are hindered phenols, but also vitamin E and compounds whose structure is analogous thereto, and also butylated condensates of p-cresol and dicyclopentadiene. HALS stabilizers (Hindered Amine Light Stabilizers), benzophenones, resorcinols, salicylates, and benzotriazoles are also suitable.

Examples of suitable antistatic agents are amine derivatives, such as N,N-bis(hydroxyalkyl)alkylamines or -alkyleneamines, alkylsulfonates, polyethylene glycol esters, copolymers composed of ethylene oxide glycol and of propylene oxide (in particular two-block or three-block copolymers in each case composed of ethylene oxide blocks and of propylene oxide blocks) glycol, and glycerol mono- and distearates, and also mixtures of these.

Suitable lubricants and mold-release agents are stearic acids, stearyl alcohol, stearic esters, amide waxes (bissstearylamide), polyolefin waxes, and generally higher fatty acids, derivatives of these, and corresponding fatty acid mixtures having from 12 to 30 carbon atoms. Another particularly suitable substance is ethylenebisstearamide (e.g. Irgawax®, Ciba, Switzerland). The amounts of these additives are in the range from 0.05 to 5% by weight.

Thermoplastic Polymer Matrix M

The thermoplastic polymer matrix M comprises at least one thermoplastic styrene copolymer P. Preferably the thermoplastic polymer matrix M consists of at least one thermoplastic styrene copolymer P, selected from acrylonitrile-butadiene-styrene copolymers (ABS), acrylonitrile-styrene-acrylate copolymers (ASA) and mixtures of said styrene copolymers with at least one further polymer component, preferably at least one polyamide (PA) and/or polycarbonate (PC), e.g. ABS/PA or ASA/PA blends.

In terms of the present invention a thermoplastic styrene copolymer P is a copolymer comprising at least one styrene and/or substituted styrene as described in formula (I) below and at least one other copolymerizable monomer. Preferably the thermoplastic styrene copolymer P comprises at least 50% by weight, preferably at least 70% by weight, based on the polymer P, of at least one styrene and/or substituted styrene as described in formula (I). More preferably the thermoplastic styrene copolymer P comprises at least 50% by weight, preferably at least 70% by weight, based on the polymer P, of unsubstituted styrene.

In a preferred embodiment the polymer matrix M comprises (preferably consists of) at least one thermoplastic styrene copolymer P, consisting of:

1.1 5-95% by weight of a copolymer A consisting of, based on A:
  1.1.1 70-76% by weight, of one or more vinyl aromatic monomer(s) A1 selected from styrene and substituted styrenes,
  1.1.2 24-30% by weight, of one or more vinyl cyanide monomer(s) A2 selected from acrylonitrile, methacrylonitrile or mixtures thereof,
  1.1.3 0-6% by weight, of one or more unsaturated copolymerizable monomers A3,
1.2 5-60% by weight of a graft rubber B consisting of, based on B:
  1.2.1 10-95% by weight of a graft base B1 comprising, based on B1:
    1.2.1.1 80-100% by weight of one or more rubber type monomer(s) B11 selected from butadiene, isoprene and $C_1$-$C_{10}$ alkyl acrylates,
    1.2.1.2 0-20% by weight of one or more polyfunctional crosslinking monomer(s) B12, such as divinylbenzene or allyl(meth)acrylate;
  1.2.2 5-90% by weight of a graft shell B2 comprising, based on B2:
    1.2.2.1 75-85% by weight of one or more vinyl aromatic monomer(s) B21 selected from styrene and substituted styrenes,
    1.2.2.2 15-25% by weight of one or more vinyl cyanide monomer(s) B22 selected from acrylonitrile, methacrylonitrile or mixtures thereof, 1.2.2.3 0-10% by weight of one or more unsaturated copolymerizable monomers B23.

The thermoplastic polymer matrix M comprises at least one styrene copolymer P as described above, wherein the graft rubber B is usually embedded in a matrix made from the rubber free vinyl copolymer A.

Preferably the thermoplastic polymer matrix M comprises, preferably consists of, at least one thermoplastic styrene copolymer P as described above wherein the vinyl aromatic monomer(s) A1 and/or B21 are selected from styrene, substituted styrenes of the formula (I)

(I)

wherein
R is $C_1$-$C_8$-alkyl or hydrogen;
$R^1$ is $C_1$-$C_8$-alkyl or hydrogen, with the provision that not both R and $R^1$ are hydrogen, and
n is 1, 2 or 3,
and mixtures of these compounds.

Preferably the vinyl cyanide monomer(s) A2 and/or B22 are acrylonitrile, methacrylonitrile or mixtures thereof, preferably acrylonitrile.

Preferably, the vinyl aromatic monomer(s) A1 and/or B21 are one or more monomers selected from the group consisting of styrene, alpha-methylstyrene and paramethylstyrene. The most preferred monomer is styrene. Also preferably the vinyl aromatic monomer(s) A1 and/or B21 are styrene or a mixture of styrene with at least one substituted styrene selected from alpha-methylstyrene and/or para-methylstyrene.

The other component of copolymer A is one or more monomers from the group of vinyl cyanide monomers A2, such as acrylonitrile or methacrylonitrile. Preferred monomer A2 is acrylonitrile.

The copolymer A may furthermore contain one or more copolymerizable monomers A3, for example from the group comprising methyl(meth)acrylate, ethyl(meth)acrylate, propyl(meth)acrylate, butyl(meth)acrylate, N-phenylmaleic imide, maleic anhydride.

The copolymer A normally contains vinyl aromatic components in an amount of 69-81% by weight, preferably 70-76% by weight, more preferably 72-76% by weight.

The content of the vinyl cyanide monomer component is normally 19-31% by weight, preferably 24-30% by weight, more preferably 24-28% by weight.

Typically, the number-average molar mass ($M_n$) of the copolymer A preferably amounts to from 15 000 to 100 000 g/mol (determined by means of GPC with UV detection). The viscosity (Vz) of the copolymer A is by way of example to from 50 to 120 ml/g (measured to DIN 53726 at 25° C. in a 0.5% strength by weight solution in DMF).

The copolymer A can be prepared by all known method, for example bulk polymerization, solution polymerization, suspension polymerization and emulsion polymerization or mixed process, e.g. mass/suspension polymerizations, with or without further components. The copolymer A is preferably prepared from the components acrylonitrile and styrene and/or α-methylstyrene via bulk polymerization or in the presence of one or more solvents, for example, toluene or ethylbenzene. A polymerization process is for example described in Kunststoff-Handbuch [Plastics Handbook], Vieweg-Daumiller, volume V, (Polystyrol) [Polystyrene], Carl-Hanser-Verlag, Munich 1969, pages 122 et seq.

The graft rubber B often has a complex structure and is in essence composed of a graft base B1 and a graft shell B2. The graft rubber B may be polymerized by emulsion, solution or suspension polymerization on the graft base B1. Emulsion polymerization is however preferred. The average particle diameter may vary from 50 nm to 10.000 nm, preferred from 80 nm to 3.000 nm, more preferred from 100 nm to 2000 nm.

Typically, the graft base B1 consists of a polymer, preferably an at least partially crosslinked polymer, with glass transition temperature below 0° C., preferred below −20° C., more preferred below −40° C.

In a preferred embodiment the monomer B11 is butadiene, more preferably the graft base B1 consists of a butadiene polymer. The butadiene monomer B11 can optionally be copolymerized with other monomers, for example styrene, acrylonitrile, (meth)acrylates or multifunctional monomers. The graft base B1 can by way of example be obtained via reaction of from 0 to 10% by weight of styrene and from 90 to 100% by weight of butadiene, and optionally also from 0.01 to 5% by weight of ancillary components, wherein the % by weight data being based on the graft base B1.

In another preferred embodiment the monomers B11 for the graft base B1 are selected from $C_1$-$C_{10}$ alkyl acrylates, preferably n-butyl acrylate, alone or together with other comonomers.

Preferably the graft base B1 comprises or consists of at least one $C_1$-$C_{10}$ alkyl acrylates as monomer B11 and 0.1 to 20% by weight, based on B1, of at least one polyfunctional crosslinking monomer B12. In a preferred embodiment, monomer B11 is n-butyl acrylate.

The graft base B1 itself might be a core/shell polymer with polymer core and shell showing different monomer composition.

The graft shell B2 of graft rubber B typically consists of monomers which copolymerize yielding a polymer with a glass transition temperature or more than +20° C., preferred more than +60° C.

Preferred monomers of graft shell B2 (monomers B21, B22 and optionally B23) are selected from styrene, alpha-methylstyrene, (meth)acrylonitrile, methyl(meth)acrylate, ethylacrylate, N-phenylmaleic imide and maleic anhydride. The graft shell can for example be obtained via reaction of styrene and acrylonitrile, and also from 0.01 to 5% by weight of ancillary components (% by weight, based on the graft shell), in the presence of the graft base.

Typically, the graft rubber B has a rubber content from 20 to 80% by weight, based on graft rubber B. The molding composition can also comprise two or more different graft rubbers B. The particle size distribution of the graft rubber B can be mono-, bi-, or polymodal. According to one particularly preferred embodiment of the invention, the particle size distribution is bimodal.

Examples of suitable preparation processes for the graft rubber B are emulsion polymerization, solution polymerization, suspension polymerization, or bulk polymerization. Preferably, the graft rubber B is prepared via aqueous free-radical emulsion polymerization. The reaction is typically initiated via water-soluble or oil-soluble free-radical polymerization initiators, e.g. inorganic or organic peroxides, such as peroxodisulfate or benzoyl peroxide, or with the aid of redox initiator systems.

The documents WO-A 2002/10222, DE-A 28 26 925, and also EP-A 022 200 describe suitable polymerization processes.

In a preferred embodiment the thermoplastic styrene copolymer P is an ABS copolymer built up from, based on P:

1.1 20-95% by weight of a copolymer A built up from, based on A,
   A1 69-81% by weight of at least one vinyl aromatic monomer, in particular styrene,
   A2 19-31% by weight of acrylonitrile, and
   A3 from 0-12% by weight of at least one other monoethylenically unsaturated monomer,
1.2 5 to 80% by weight of a graft rubber B having monomodal or bimodal particle size distribution, preferably having bimodal particle size distribution, built up from, based on B,
   1.2.1 40-90% by weight of a graft base B1, built up from, based on B1:
     B11 80-100% by weight of at least one conjugated diene, in particular butadiene, and
     B12 0-10% by weight of at least one polyfunctional, crosslinking monomer and
   1.2.2 10-60% by weight of a graft shell B2, built up from, based on B2:
     B21 75-85% by weight of at least one vinyl aromatic monomer, in particular styrene,
     B22 15-25% by weight of acrylonitrile,
     B23 0-10% by weight of at least one other monoethylenically unsaturated monomer, and 0-10% by weight of at least one polyfunctional crosslinking monomer.

In a preferred embodiment the amounts of A+B, B1+B2, A1+A2, B21+B22 sum up to 100% by weight.

Preferably the copolymer A described above has a viscosity number VN (determined according to DIN 53726 at 25° C., 0.5% by weight in dimethylformamide) of from 50 to 120 ml/g.

Such preferred ABS resins are described for example in U.S. Pat. Nos. 6,323,279, 5,760,134 and 6,579,937. ABS (acrylonitrile-butadiene-styrene) resins which are commonly known and commercially available can be used as thermoplastic styrene copolymer P.

Typical examples of suitable commercially available ABS products are Novodur® and Terluran®, for example Novodur® HH106, Terluran® GP22; Terluran® HI-10, all of which are obtainable from INEOS Styrolution Group GmbH (Frankfurt, Germany).

In another preferred embodiment the thermoplastic styrene copolymer P is an ASA copolymer built up from, based on P:

1.1 20-95% by weight of a copolymer A, built up from, based on A,
   A1 69-81% by weight of at least one vinyl aromatic monomer, in particular styrene,
   A2 19-31% by weight of acrylonitrile, and
   A3 from 0-12% by weight of at least one other monoethylenically unsaturated monomer;
1.2 5-80% by weight of a graft rubber B built up from, based on B,
   1.2.1 40-90% by weight of a graft base B1 with a glass transition temperature ($T_g$) below −10° C., which is an at least partially crosslinked acrylate polymer built up from, based on B1:
     B11 50-99.9% by weight, based on B1, of at least one $C_1$-$C_{10}$-alkyl acrylate, in particular n-butyl acrylate,
     B12 0.1-20% by weight, based on B1, of at least one polyfunctional crosslinking monomer and
     B13 0-49.9% by weight, based on B1, of a further monomer which is copolymerizable with monomer B11 selected from the group consisting of the vinyl $C_1$-$C_8$-alkyl ethers, butadiene, isoprene, styrene, acrylonitrile and methacrylonitrile, and/or methyl methacrylate;
   1.2.2 10-60% by weight of a graft shell B2, with a ($T_g$) above 50° C., grafted onto the graft base B1 and built up from, based on B2:
     B21 75-85% by weight, based on B2, of at least one vinyl aromatic monomer, in particular styrene,
     B22 15-25% by weight, based on B2, of acrylonitrile and/or methacrylonitrile,
     B23 0-10% by weight, based on B2, of at least one polar, copolymerizable monomer selected from the group consisting $C_1$-$C_4$-alkyl (meth)acrylates, maleic anhydride, maleimides, (meth)acrylamide and vinyl $C_1$-$C_8$-alkyl ethers.

Preferably the ASA copolymer A described above has a viscosity number VN (determined according to DIN 53726 at 25° C., 0.5% by weight in dimethylformamide) of from 50 to 120 ml/g.

Preferably the monomer B11 is a $C_1$-$C_{10}$-alkyl acrylate, i.e. an alkyl acrylic acid ester, wherein the alkyl residue is an alkyl residue having 1 to 10 carbon atoms ($C_1$-$C_{10}$ alkyl residue). More preferably, the monomer B11 is a $C_1$-$C_8$-alkyl acrylate, even more preferably a $C_4$-$C_8$-alkyl acrylate. Preferably, the monomer B11 may be selected from the group consisting of butyl acrylate (acrylic acid butyl ester), ethylhexyl acrylate (acrylic acid ethylhexyl ester), cyclohexyl acrylate (acrylic acid cyclohexyl ester), methyl acrylate (acrylic acid methyl ester), ethyl acrylate (acrylic acid ethyl ester), propyl acrylate (acrylic acid propyl ester) and pentyl acrylate (acrylic acid pentyl ester), heptyl acrylate (acrylic acid heptyl ester), octyl acrylate (acrylic acid octyl ester). Even more preferably, the acrylate may be selected from the group consisting of butyl acrylate, ethylhexyl acrylate and cyclohexyl acrylate. Highly preferably, the monomer B11 is n-butyl acrylate or 2-ethylhexyl acrylate, particularly n-butyl acrylate.

Preferably the graft base B1 of the ASA copolymer is an at least partially crosslinked acrylate polymer and B1 comprises 0.1-20% by weight, preferably 0.1-5% by weight, based on B1, of one or more polyfunctional crosslinking monomer(s) B12. Preferably the monomer B12 is a double unsaturated monomer, for example divinylbenzene or allyl (meth)acrylate. In particular, the monomer B12 is selected from the group consisting of an allyl(meth)acrylate (i.e. allyl methacrylate and/or allyl acrylate), divinylbenzene, diallyl maleate, diallyl fumarate, diallyl phthalate, triallyl cyanurate, and dicyclopentadienyl acrylate.

Further, the graft base B1 may as an optional monomer comprise 0-49.9% by weight, based on B1, of one or more further monomer(s) B13, which is copolymerizable with monomer B11. For example the further monomer B13 can be selected from the group consisting of dienes (e.g. 1,3-butadiene, isoprene), styrene, alpha-methylstyrene, acrylonitrile, methacrylonitrile, methyl acrylate, ethyl acrylate, propyl acrylate, methyl methacrylate, ethyl methacrylate, phenylmaleimide, acrylamide and vinyl $C_1$-$C_8$-alkyl ethers (e.g. vinyl methyl ether). More preferably the monomer B13 can be selected from the group consisting of vinyl $C_1$-$C_8$-alkyl ethers, butadiene, isoprene, styrene, acrylonitrile, methacrylonitrile, and methyl methacrylate.

For example the graft base B1 is a copolymer of an acrylate, most preferably n-butyl acrylate, and one or more comonomer(s) B12 and/or B13. For example the graft base B1 may be a terpolymer from an acrylate, most preferably n-butyl acrylate, a diene (e.g. butadiene or isoprene) and vinyl methyl ether. For example the graft base B1 may be a an acrylate-diene copolymer (preferably a n-butyl acrylate-butadiene copolymer).

Preferably, the graft base B1 bears latex-like properties and bears a glass-transition temperature of less than 25° C., more preferably of less than 20° C., even more preferably of less than 10° C. or even less than 0° C.

Suitable ASA copolymers P comprise graft rubbers B of an acrylate based rubber, in particular a butyl acrylate rubber, upon which a mixture of at least one vinyl aromatic monomer, in particular styrene, and acrylonitrile and optionally further monoethylenically unsaturated monomers is grafted. Said ASA graft rubbers B can be used as thermoplastic styrene copolymer P preferably, in mixture with a rubber free vinyl copolymer A as defined above.

In particular a copolymer A of a vinyl aromatic monomer A1 and acrylonitrile as monaomer A2 and optionally an additional monoethylenically unsaturated monomer A3 is used. The ASA graft rubber B is usually embedded in a matrix made from the rubber free vinyl copolymer A. An ASA copolymer comprising an acrylate graft rubber B and a styrene-acrylonitrile copolymer A (SAN matrix) is very particular preferred and is commercially available e.g. from INEOS Styrolution company as Luran® S, or example Luran® S 797; Luran® S 778T and Luran® S 757.

ASA (acrylonitrile-styrene-acrylate) resins which are commonly known and commercially available can be used as thermoplastic styrene copolymer P. Typical examples of suitable commercially available ASA products are Luran® S, for example Luran® S KR2858G3 (ASA), Luran® S 797; Luran® S 778T; Luran® S 757; Luran® S KR2864C (ASA/PC), all of which are obtainable from INEOS Styrolution company (Frankfurt, Germany).

Graft rubbers B can be prepared by known polymerization techniques, such as solution or bulk polymerization or emulsion polymerization. Suitable graft rubbers B and their preparation are disclosed for example in U.S. Pat. Nos. 5,760,134 and 6,579,937 to which is in particular referred.

It is also possible to use mixtures or blends of the above mentioned thermoplastic styrene copolymers P as thermoplastic polymer matrix M. In an particular embodiment of the invention the thermoplastic polymer matrix M consists of a blend of at least one of the thermoplastic styrene copolymer P as describes above, e.g. ABS and/or ASA, and at least one further polymer selected from polycarbonates and polyamides, preferably from polyamides, for example selected from polyamide 6, polyamide 11, polyamide 6/6, polyamide 6/10, polyamide 6/12, polyamide 11 and polyamide 12. In a preferred embodiment the thermoplastic polymer matrix M consists of 1 to 99% by weight, preferably from 20 to 80% by weight, more preferably from 40 to 60% by weight of at least one thermoplastic styrene copolymers P as described above, e.g. ABS or ASA, and 1 to 99% by weight, preferably from 20 to 80% by weight, more preferably from 40 to 60% by weight, of at least one polyamide as described above.

Typical examples of suitable commercially available ABS/PA products are Terblend® N, for example Terblend® N NG-02 EF (ABS/PA) and Terblend® N NM-21 EF (ABS/PA); obtainable from INEOS Styrolution company (Frankfurt, Germany).

Typical examples of suitable commercially available ASA/PA products are Terblend® S, for example Terblend® S NM-31, obtainable from INEOS Styrolution company (Frankfurt, Germany).

Preferably the thermoplastic polymer matrix consists of at least polymer selected from ABS, ABS/PA and ASA. In particular the commercial products Terblend® N (ABS/PA polymers of INEOS Styrolution Group GmbH) (e.g. Terblend® N NM 21 EF, Terblend® N NG02EF), Luran® S (ASA polymers from INEOS Styrolution Group GmbH) (e.g. Luran® S KR2858G3) and Novodur® (ABS polymers from INEOS Styrolution Group GmbH) (e.g. Novodur® HH106) are preferably used as thermoplastic polymer matrix M.

Foaming Agent F

The foamable material S comprises (preferably consisting of) a thermoplastic polymer matrix M as described above and at least one foaming agent F selected from chemical foaming agents releasing carbon dioxide and physical foaming agents selected from nitrogen and carbon dioxide. Preferably, a chemical foaming agent releasing carbon dioxide or a physical foaming agent selected from nitrogen and carbon dioxide or mixtures thereof are used as the sole foaming agent(s) in the inventive process.

However, the foaming agent F may comprise one or more other foaming agents selected from among known chemical or physical foaming agents. In a preferred embodiment the foamable material S comprises a thermoplastic polymer matrix M and at least one foaming agent F selected from chemical foaming agents which release carbon dioxide. More preferably a chemical foaming agent releasing carbon dioxide is used in the inventive process as the sole foaming agent.

Customary foaming agents known to those skilled in the art, for example, it is possible to use foaming agents selected from:

a) chemical foaming agents, preferably chemical foaming agents releasing carbon dioxide, e.g. chemical foaming agents based on sodium bicarbonate;
b) physical foaming agents, preferably nitrogen and/or carbon dioxide which is mixed with the thermoplastic polymer matrix M in a supercritical state.

Generally substances or mixtures of substances which eliminate gas, preferably nitrogen or carbon dioxide at elevated temperatures, in particular at temperatures in the range from 130° C. to 250° C., are used as chemical foaming agents. Such chemical foaming agents are known to those skilled in the art and are described in the literature.

Preferred chemical foaming agents are 1,1'-azobis(formamide), sulfohydrazides such as 4,4'-oxybis(benzene sulfohydrazide), p-toluenesulfonyl hydrazide or p-toluenesulfonyl semicarbazide, dinitrosopentamethylenetetramine, phenyltetrazole, alkali metal carbonate or alkali metal hydrogencarbonate.

More preferably a chemical foaming agent based on an bicarbonate salt and citric acid is used as foaming agent F, more preferably as the sole foaming agent F. In particular, sodium carbonate $Na_2CO_3$ or sodium bicarbonate $NaHCO_3$ can be used. As very particularly preferred chemical foaming agent F, a mixture of sodium bicarbonate and citric acid is used. This mixture preferably comprises from 10 to 90% by weight, in particular from 20 to 80% by weight, particularly preferably from 30 to 70% by weight, of sodium bicarbonate and from 90 to 10% by weight, in particular from 80 to 20% by weight, particularly preferably from 70 to 30% by weight, of citric acid, where the % by weight all based on the total weight of the foaming agent F and preferably together add up to 100% by weight.

For example the commercial available foaming agents of Hydrocerol® series from Clariant, such as Hydrocerol® ITP, can be used as foaming agent.

In particular, in this embodiment the foamable material S comprises at least 0.1% by weight, preferably from 0.1 to 10% by weight, more preferably 0.1 to 3% by weight, based on the foamable material S, of the at least one chemical foaming agent F releasing carbon dioxide. Preferably, the foamable material S comprises at least 0.1% by weight, preferably from 0.1 to 5% by weight, based on the foamable material S, of a chemical foaming agent comprising bicarbonate and citric acid as sole foaming agent.

In the case of physical foaming using a physical foaming agent, gas evolution generally occurs by outgasing of the foaming agent as a result of a decrease in pressure and/or increase in temperature. The volatile solvent may for example be a volatile organic solvent, such as pentane, or a gas, such as carbon dioxide or nitrogen, which is dissolved in the polymer matrix M in a supercritical state (e.g. MuCell® process).

In a preferred embodiment the foamable material S comprises the thermoplastic polymer matrix M and at least one foaming agent F being a physical foaming agent selected from nitrogen and carbon dioxide, preferably as sole foaming agent F. In particular, in this embodiment the foamable material S comprises at least 0.01% by weight, preferably from 0.01 to 5% by weight, more preferably 0.1 to 3% by weight, based on the foamable material S, of the at least one physical foaming agent selected from nitrogen and carbon dioxide.

Step a)—Providing the Melt of Foamable Material S

The inventive process comprises the step a) of providing a melt of the foamable material S described above comprising a thermoplastic polymer matrix M and at least one foaming agent F, wherein the melt temperature is equal or higher than 240° C., preferably equal or higher than 255° C., more preferably equal or higher than 265° C. Also preferably, the melt temperature is in the range of 240° C. to 300° C., preferably in the range of 255° C. to 300° C., more preferably in the range of 270° C. to 290° C.

The foamable material S and its components are described above in detail.

In terms of the present invention the melt temperature can be understood as the temperature of the melt of the foamable material S shortly before or during injection of the melt into the mold cavity in step b).

Typically the melt temperature is the actual temperature of the melt of the polymer material as it exits the nozzle and enters the mold cavity K. Normally, the thermoplastic polymer matrix M and/or the foamable material S is molten in the extruder unit encompassing extruder screw and extruder barrel of an injection molding machine. Typically, the temperature in the extruder unit is adjusted by means of heating devices along the extruder barrel and the temperature is controlled via several setpoints. The actual melt temperature is influenced mainly by said heating devices but also by the mechanical work imparted to the material, the residence time, and the conditions of the screw and barrel.

Most preferably the at least one foaming agent is added to the melt of the thermoplastic polymer matrix M by means of suitable dosage units placed at the extruder unit of the injection molding machine. In case that an chemical foaming agent releasing carbon dioxide is used the thermoplastic polymer matrix M and the foaming agent can also mixed before filling the mixture in the extruder unit, e.g. preparation of a dry blend of polymer matrix and foaming agent. In case of carbon dioxide or nitrogen as physical blowing agents, the preparation of the foamable material S is preferably carried out by means of and as part of a MuCell® or Cellmould®. MuCell® or Cellmould® process normally utilizes a specific dosage unit at the extruder unit to add an inert gas, such as nitrogen and/or carbon dioxide, under pressure into the melt of the polymer matrix M resulting in a physical solution of the gas in the polymer melt. The inert gas typically release from the polymer melt at reduced pressure by foaming of the material (see step c).

In particular the step of providing the melt of the foamable material S (step a) is carried out by melting the thermoplastic polymer matrix M and mixing said melt with the at least one foaming agent F, preferably under pressure, and optional adding further additives as described above. The thermoplastic polymer matrix is typically plasticized and intensively mixed with the foaming agent F and optional further additives in step a). Mainly depending on the components of the thermoplastic polymer matrix M the thermoplastic matrix is preferably heated up to a temperature significantly above the softening point, preferably above the melting point of the thermoplastic matrix M. Preferably the temperature is raised up to a temperature in the range of 200° C. to 300° C., preferably in the range of 240° C. to 300° C., more preferably in the range of 265° C. to 290° C. in step a) in the event that an ABS or an ABS blend is used as thermoplastic matrix material M.

The foamable material S comprising the thermoplastic polymer matrix material M and the foaming agent F can in principle be produced in step a) by means of and as a part of a forming process known to those skilled in the art for producing of molded parts, in particular of foam molded parts. Typically the process step a) is carried out in the extruder unit encompassing extruder screw and extruder barrel of an injection molding machine. The process step a) is preferably carried out by means and as a part of a process selected from the group consisting of thermoplastic foam casting processes (TFC), thermoplastic foam injection molding processes, foam pressing processes, foam injection-compression molding processes, RTM processes (resin transfer molding), MuCell® processes, and Cellmould® processes. Most preferably, the process step a) is carried out by means and as a part of a thermoplastic foam injection molding processes or an MuCell® process.

Step b) Injection

The inventive process comprises the step b) of filling a mold cavity K with the melt of the foamable material S by injection; wherein the mold temperature is equal or higher than 50° C., preferably equal or higher than 70° C. Also preferably, the mold temperature is in the range of 50° C. to 150° C., more preferably in the range of 70 to 120° C.

Also preferably the mold temperature is reduced from 150° C. (at the start of injection) to 60° C., preferably from 120 to 70° C. during steps b) an/or c).

In terms of the present invention the mold temperature is the actual surface temperature of the mold cavity at the moment of filling the mold cavity with the melt by injection in step b) The temperature of the mold cavity can be adjusted by means of known tempering parts, such as cooling and/or heating devices. The tempering parts may be part of the injection molding machine or can be combined with the injection molding machine as external unit.

Typically the temperature of the mold cavity is below the temperature of the polymer melt injected into the mold cavity. Typically the mold cavity is cooled below the melting point of the thermoplastic polymer matrix M, preferably below the softening point of the polymer matrix M. In conventional processes the mold temperature is typically adjusted (fixed) at a defined temperature below the softening point of the polymer matrix. The so called variotherm process control includes the variation of the mold temperature during the cooling (solidification) step.

Typically, in the variotherm process control the mold cavity is heated before injection of the melt of the foamable material and afterwards cooled in order to facilitate the solidification of the polymer matrix M. By variation of the temperature of the mold cavity and of the cooling rate the solidification of the polymer melt and thus the properties of the resulting molded part can be controlled.

In particular the melt of the foamable material S is filled into the mold cavity by injection via one or more nozzle(s). Often the melt spreads in a preferential direction into the mold cavity during filling of the mold cavity K by injection. The process step b) is, in particular, be carried out by means of and as a part of a forming process known to those skilled in the art for producing molded parts, in particular foam molded parts. The process step b) (filling of the mold cavity K) is preferably carried out by means and as a part of a process selected from the group consisting of thermoplastic foam casting processes (TFC), thermoplastic foam injection molding processes, foam pressing processes, foam injection-compression molding processes, RTM processes (resin transfer molding), MuCell® processes, and Cellmould® processes.

Partial or also complete foaming of the foamable material (S) may occur in process step b). In this context, steps b) and c) may be carried out simultaneous, e.g. in case that the foaming is effected by the reduction of pressure after injection.

In a preferred embodiment filing of the mold cavity K with the melt of the foamable material S by injection in step b) is carried out with an injection speed in the range of 90 to 250 ccm/s, preferably in the range of 100 to 200 ccm/s, most preferably in the range of 150 to 180 ccm/s, even preferably with an injection speed of about 165 ccm/s. The injection speed may be understand as the speed of the molten material passing the nozzle in volume per time unit (e.g. given in ccm per second).

Preferably, the mold cavity K exhibits a polished or a grained surface, preferably having grain domains of at least 10 µm. In a preferred embodiment the mold cavity K exhibits a grained surface having grain domains of at least 10 µm, preferably of at least 50 µm, more preferably of at least 250 µm.

In particular the grained surface has grain domains in the range of 10 to 500 µm, preferably 50 to 300 µm. In terms of the present invention grain domains are understand as being the difference between the high and depth of the grains.

Typically, the mold cavity can exhibit a thickness of about 2 to 10 mm. The dimension (length, width and/or diameter) of the mold are typically in the range of 10 to 10.000 mm, preferably 100 to 500 mm, more preferably in the range of 200 to 400 mm.

As a rule the dimension and the maximal size of the mold is determined by the number of injection nozzles and the viscosity of the melt.

Preferably the mold cavity K is filled with the melt of the foamable material S by injection (step b) via one or more nozzle, wherein the number of nozzles is in the range of 1 to 64. It is also possible to use cascade opening of the nozzles and/or multi cavities.

Step c) Foaming

The inventive process comprises the step c) of foaming the foamable material S in the mold cavity K by reduction of pressure and/or increase in temperature. Foaming of the foamable material S in step c) of the inventive process is effected by means of nitrogen or carbon dioxide resulting from a physical and/or chemical foaming agent F.

In a further preferred embodiment of the invention, foaming of the foamable material S in step c) of the inventive process is effected by using reduced, e.g. subatmospheric, pressure and/or an increase in temperature. The application of reduced pressure relates to the pressure in the mold cavity. The reduced pressure employed can be in the range from 0.01 to 1 bar, preferably in the range from 0.1 to 1 bar, more preferably in the range from 0.5 to 1 bar. The temperature during foaming is dependent on the polymer matrix and foaming agent and can, in particular, be in the range from 50° C. to 300° C., preferably in the range from 80° C. to 250° C., more preferably in the range from 130° C. to 250° C.

In the case of foaming using physical foaming agents or chemical foaming agents, gas evolution generally occurs by outgasing of the foaming agent as a result of a reduction of pressure and/or increase in temperature. In the case of chemical foaming gas evolution may also occurs as a result of decomposition of the foaming agent to form a gaseous product, in particular as the result of a temperature increase.

Preferably, the foaming in step c) occurs as a result of reducing pressure. Preferably, the foaming in step c) occurs as a result of opening of the mold cavity K, preferably in a defined direction.

In a further preferred embodiment the foaming in step c) is carried out by reduction of pressure and wherein reduction of pressure and foaming is performed together with the injection step b).

In a preferred embodiment foaming of the foamable material S in step c) (or particularly in the steps b) and c) together) results in a density reduction in the range of 0.1 to 20%, preferably in the range of 5 to 18%, more preferably in the range of 7 to 18%, most preferably about 17.5%. The standard density reduction (SDR) in [%] resulting by foaming is given by $(d_{comp} - d_{foam})/d_{comp} * 100\%$, with $d_{foam}$ is density (mass per unit volume, e.g. kg/m³) after foaming and $d_{comp}$ is density before forming (density of the solid compact polymer).

Step d)—Taking Out of the Foam Molded Part

The taking out of the foam molded part is effected after foaming and possibly after cooling of the foamed molding. Here, depending on the configuration of the foaming step c), the molding can be taken out from the opened mold cavity K or from the further cavity in which the foaming step was carried out.

Typically the foam molded part is taken out of the mold cavity K after cooling of the material to a temperature near or preferably below the heat deflection temperature of the polymer matrix M. Normally, the heat deflection temperature is determined according to standard DIN EN ISO 75 or ASTM D648 standard. Another parameter for heat resistant is the Vicat softening temperature determined according to DIN EN ISO 306.

Typically the cycle time of the foam injection molding process, in particular the process encompassing the steps a) to d) are in the range of 2 to 120 seconds, in particular 10 to 100 seconds.

Step e)—Further Working of the Foam Molded Part

As an optional step the inventive process may encompass the further working of the foam molded part. In particular, step e) may encompass surface machining (e.g. grinding, polishing), removal of projecting margins and/or treatment of the surface with a composition for effecting functionalization (for instance a flame retardant composition).

In a preferred embodiment of the invention the thermoplastic polymer matrix M consists of ABS, wherein the melt temperature is in the range of 240° C. to 300° C., preferably in the range of 255° C. to 300° C., more preferably in the range of 265° C. to 290° C.; wherein the mold temperature is in the range of 50° C. to 100° C., preferably in the range of 70 to 90° C., and wherein the foaming of the foamable material S in step c) results in a density reduction in the range of 7 to 18%.

According to another preferred embodiment the thermoplastic polymer matrix M consists of ASA (e.g. Luran® S), wherein the melt temperature is in the range of 240° C. to 300° C., preferably in the range of 255° C. to 300° C., more preferably in the range of 265° C. to 290° C.; wherein the mold temperature is in the range of 50° C. to 100° C., preferably in the range of 70 to 90° C., and wherein the foaming of the foamable material S in step c) results in a density reduction in the range of 7 to 18%, preferably 8 to 12%, more preferably of about 10%.

Another preferred embodiment is directed to an process as described wherein the thermoplastic polymer matrix M consists of 1 to 99% by weight, preferably from 20 to 80% by weight, more preferably from 40 to 60% by weight of at least one thermoplastic styrene copolymers P selected from ABS and ASA, preferably from ABS, and 1 to 99% by weight, preferably from 20 to 80% by weight, more preferably from 40 to 60% by weight, of at least one polyamide (e.g. Terblend® N), wherein the melt temperature is in the range of 240° C. to 300° C., preferably in the range of 255° C. to 300° C., more preferably in the range of 265° C. to 290° C.; wherein the mold temperature is in the range of 50° C. to 100° C., preferably in the range of 70° C. to 90° C., and wherein the foaming of the foamable material S in step c) results in a density reduction in the range of 5 to 20%, preferably 6 to 12%, preferably 7 to 9%, more preferably of about 8%.

A preferred embodiment is directed to an process as described above wherein the thermoplastic polymer matrix M consists of ABS, ASA or a blend of ABS and at least one polyamide PA, wherein the melt temperature is in the range of 265° C. to 290° C.; wherein the mold temperature is in the range of 70 to 90° C., and wherein the foaming of the foamable material S in step c) results in a density reduction in the range of 7 to 18%.

A preferred embodiment is directed to an process as described above, wherein the melt temperature is in the range of 240° C. to 300° C., preferably in the range of 255° C. to 300° C., more preferably in the range of 265° C. to 290° C.; wherein the mold temperature is in the range of 50° C. to 100° C., preferably in the range of 70° C. to 90° C., and wherein the filing of the mold cavity K with the melt of the foamable material S by injection in step b) is carried out with an injection speed in the range of 100 to 200 ccm/s, preferably of 150 to 180 ccm/s.

In the preferred embodiments described above the foaming agent is preferably a chemical foaming agent releasing carbon dioxide, preferably a chemical foaming agent based on sodium bicarbonate and citric acid, or a physical foaming agent selected from nitrogen and carbon dioxide.

Further, the present invention relates to a foam molded part produced by the inventive process described above.

Preferably the obtained foam molded parts are structural parts encompassing an outer skin layer and an inner zone. Preferably the skin layer thickness of the obtained structural foam molded parts is in the range of 0.5 to 2 mm, preferably in the range of 0.8 to 1.1 mm.

The foam molded parts obtained via the inventive process can for example used in the automobile sector, e.g. in bodywork construction for vehicles, for the interior of automobiles, e.g. for display consoles. In addition, the foam molded parts obtained via the inventive process can be suitable for all applications in which foam moldings having structural stiffness are required. The moldings of the invention can be employed, in particular, in the construction of ships, aircraft or trains, in particular as lining parts, undertray components, dashboards, shell construction for seats, bulkheads. Furthermore, nonautomotive applications of the moldings of the invention are also conceivable, e.g. formwork plates, lining elements, supporting shells and casing components.

The present invention is further illustrated by the following experiments and claims.

EXPERIMENTAL EXAMPLES

Example 1: Process for Producing Foams

Hydrocerol® 473 (Clariant, Frankfurt), which is a chemical foaming mixture based on sodium bicarbonate and citric acid, was used as foaming agent F. The chemical foaming agent was used in an amount of 2% by weight, based on the total foamable composition.

Further, a foam injection molding process performed with MuCell® process using nitrogen in an amount of 0.3%, based on the total foamable material, was carried out.

The following styrene copolymers and blends thereof, are investigated in the testing:

P1 Terblend® N NM 21 EF (INEOS Styrolution Group GmbH, Frankfurt), which is a blend of acrylonitrile/butadiene/styrene-copolymer and polyamide (ABS/PA);

P2 Terblend® N NG02EF (INEOS Styrolution Group GmbH), which is a glass fiber reinforced blend of acrylonitrile/butadiene/styrene-copolymer and polyamide (ABS/PA) including 8 wt.-% of glass fiber;

P3 Novodur® HH106 (INEOS Styrolution Group GmbH), which is an acrylonitrile/butadiene/styrene-copolymer (ABS);

P4 Fibremod™ GE277A1 (Borealis), which is a commercial glass fiber reinforced polypropylene PP including 20 wt.-% filler (comparative example).

The results were compared to foams made of commercially available polypropylene PP and glass-fiber reinforced polypropylene PP-GF (P4) as thermoplastic polymer matrix M, which are common commercial foam products and which were used as a benchmark.

Also experiments were carried out using Luran® S, which is an acrylonitrile/styrene/acrylate-copolymer ASA; commercially available (INEOS Styrolution, Frankfurt). The molding tool was a 2K-plate with polished surface and 2.5 mm wall thickness (400 mm×200 mm×2.5 mm). Further different molds with grained surface and 3 mm wall thickness were used (see example 1.3). An injection foam molding machine Engel Duo 450 with a 3-zone extruder of 60 mm was used.

The mold temperature was 60° C.

Example 2: Variation of Foaming Conditions

The standard density reduction before and after the foaming was determined using a hydrostatic balance.

Standard reduction of density (SRD) in [%] is defined as: SRD=($d_{foam}$−$d_{comp}$)/$d_{comp}$*100%; with $d_{foam}$ is density after foaming and $d_{comp}$ is density before forming (compact solid polymer).

Further, the thickness of the skin layer of the foam molded part was determined using light microscopy. The foam molded parts obtained are integral foams composed of an outer dense layer (also referred to as skin layer) and a light, cellular core.

Using a standard computer program for statistical test planning and data analysis (MODDE) an optimum of process conditions in view of maximal standard density reduction and minimal thickness of skin layer $d_{SL}$ are determined. A maximum density reduction of 17.5% was obtained at melt temperature $T_M$ in the range of 265° C. to 300° C. and, in particular of about 270° C., and an injection velocity in the range of 150 to 190 cm/s, in particular of 160 ccm/s (cm³ per second). An minimum thickness of skin layer of 0.9 mm was obtained.

Figure 1A:
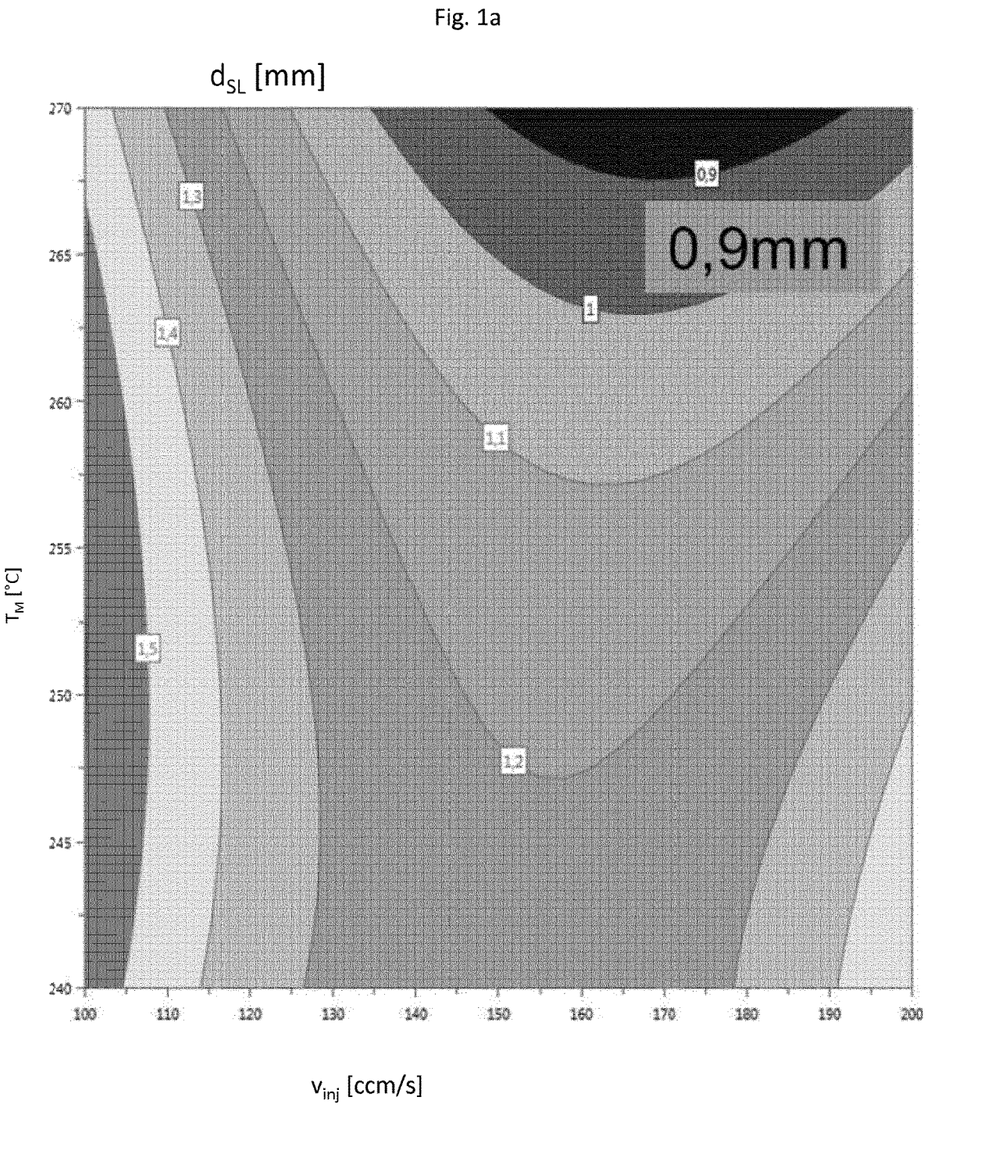
FIG. 1a shows the results of statistical data analysis of the experimental results concerning the thickness of the skin layer $d_{SL}$ in dependency from the injection speed $v_{inj}$ and the melt temperature $T_m$.
Figure 1B:
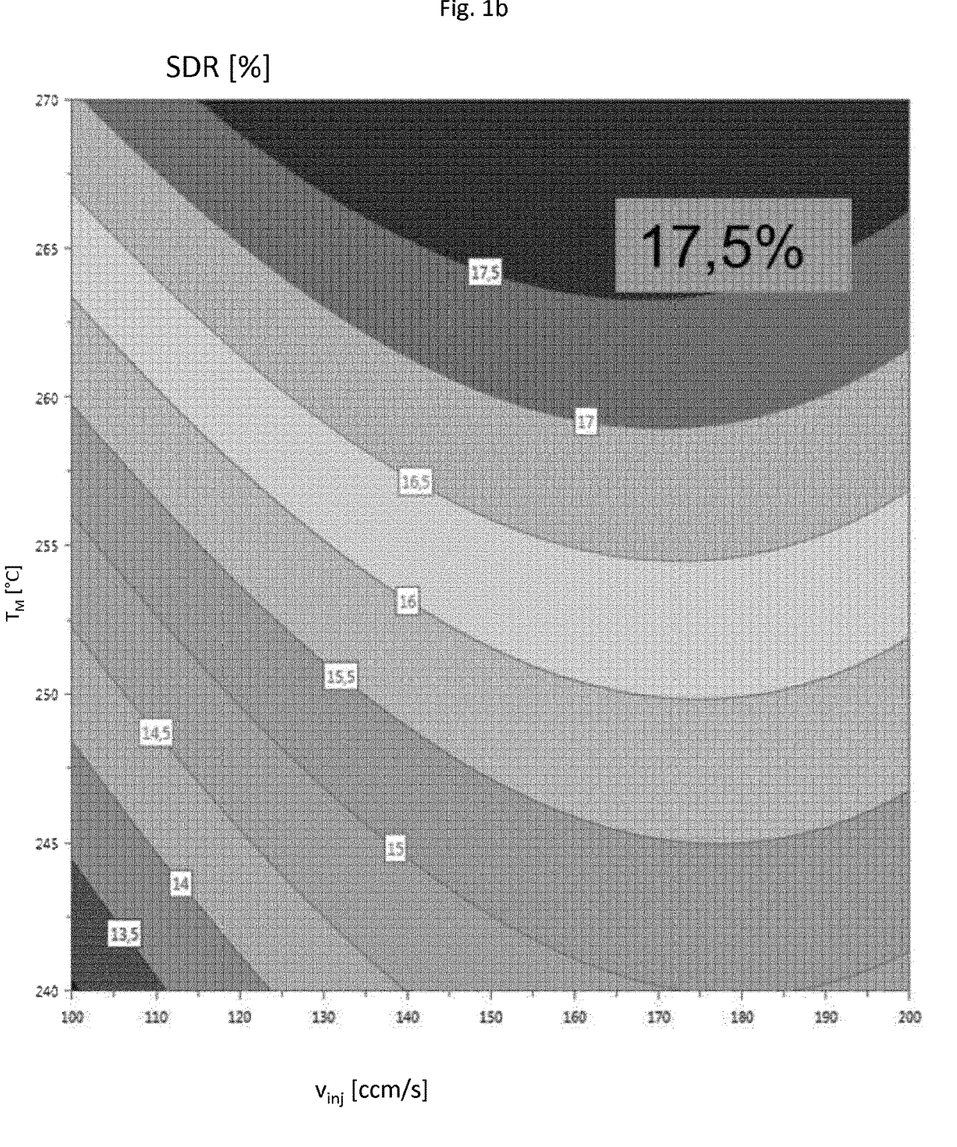
FIG. 1b shows the results of statistical data analysis of the experimental results concerning standard density reduction SDR in dependency from the injection speed $v_{inj}$ and the melt temperature $T_m$. The results are obtained from statistical data analysis program MODDE using Novodur® HH106 (ABS) as polymer P.
Figure 2:
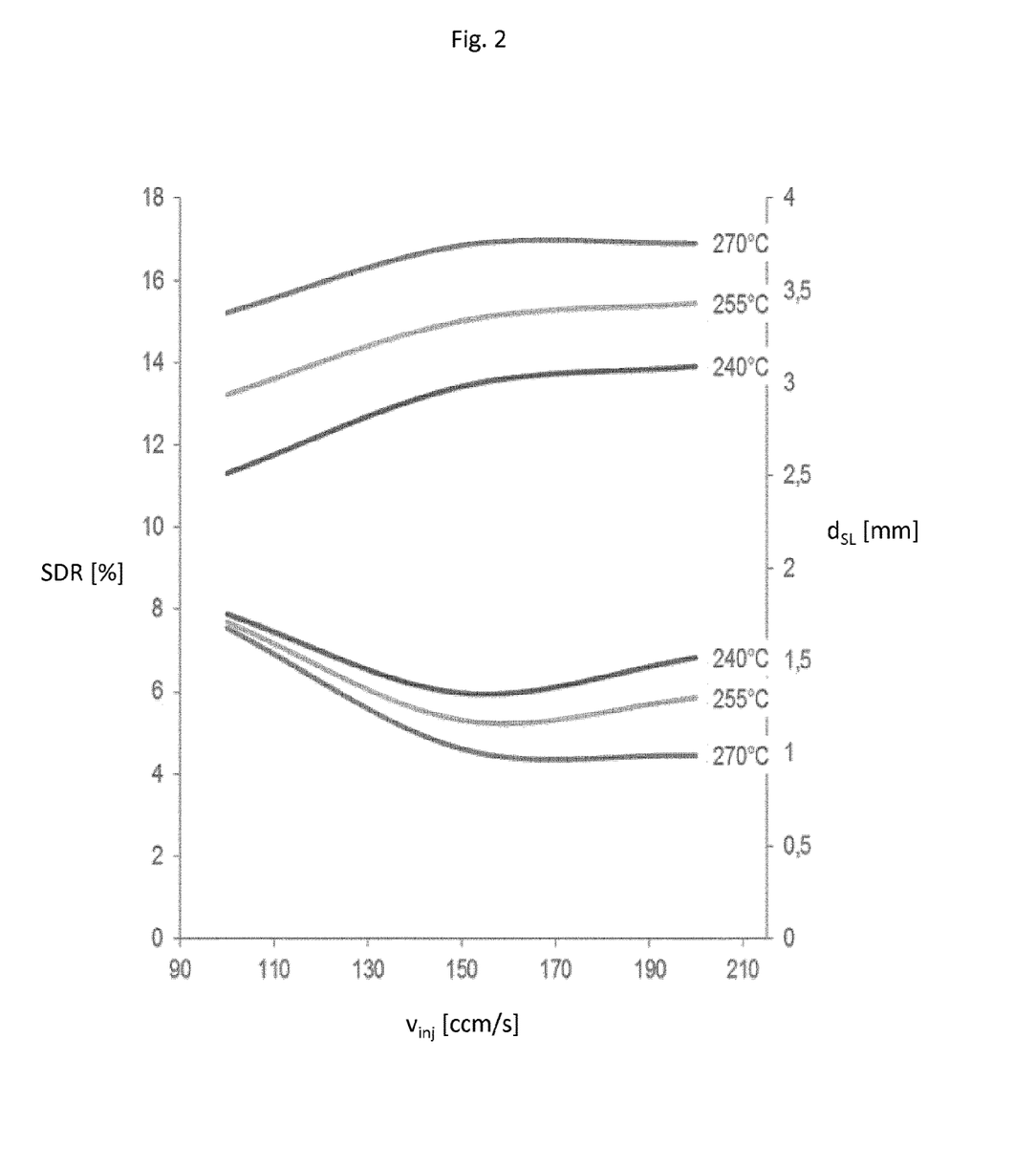
FIG. 2 is a diagram showing the standard density reduction SDR (the upper 3 curves) and the thickness of skin layer $d_{SL}$ (the lower 3 curves) in dependency from the injection speed $v_{inj}$ and the melt temperature $T_m$. The results are obtained from statistical data analysis program MODDE using Terblend® N NM 21 EF (ABS/PA blend) as polymer P.

The results of statistical data analysis are shown in FIGS. 1a and 1b (for Novodur® HH106 (ABS) as polymer P) and FIG. 2 (Terblend® N NM 21 EF (ABS/PA blend) as polymer P).

The optimal conditions determined by statistical data analysis are as follows: injection speed of 165 ccm/s, a melt temperature of 270° C., a mold temperature of 80° C., a density reduction of 17.5% and a skin layer thickness of 0.9 mm.

The mold temperature was varied from 50° C. up to 110° C. (with static temperature control) and from 50 to 140° C. (dynamic temperature control).

Example 3: Mechanical and Surface Properties of Foams a) The following polymer materials P were used Foams were produced as described in example 2 using the polymer materials P1 to P4 wherein 2% by weight, based on the foamable composition S, of the foaming agent Hydrocerorwere used. The produced foam molded parts exhibited a thickness of 2.5 mm (mold with polished surface).

b) The bending stress given in [MPa] of the moldings was determined according to DIN EN ISO 178. The perforation energy given in [J] was determined according to DIN EN ISO 6603-1178 at a temperature of 23° C. and a penetration energy of 200 kJ. The results are summarized in the following table 1:

TABLE 1

Mechanical properties of foam molded parts

| No. | polymer material P | bending stress [MPa] compact reference | bending stress [MPa] foam | perforation energy [J] compact reference | perforation energy [J] foam | density reduction [%] |
|---|---|---|---|---|---|---|
| 1 | P1 | 50 | 44 | 52,000 | 11,800 | 10 |
| 2 | P2 | 75 | 53 | 8,400 | 5,000 | 10 |
| 3 | P3 | 73 | 63 | 12,500 | 6,100 | 7.5 |
| C1 | P4 | 74 | 65 | 4,200 | 2,900 | 10 |

The compact reference is the starting polymer material not foamed.

The investigation of mechanical properties of the foam clearly shows that the use of styrene polymers, such as ABS, has advantages over glass-fiber reinforced polypropylene (GF-PP), in particular in view of impact strength of the foams. In particular because of an higher energy absorption of the ABS materials in comparison to GF-PP better mechanical properties can be achieved using ABS or ABS blends.

c) In a second series, the surface quality of styrene copolymer foams versus glass fiber reinforced polypropylene foams was assessed after performing foam injection molding trials as described above.

The results are summarized in the following Table 2:

TABLE 2

Evaluation of surface quality

| No. | Polymer material P | Mold temperature [° C.] | Wall thickness of foam part [mm] | Mold surface | Density reduction [%] | Surface quality |
|---|---|---|---|---|---|---|
| 4 | P3 | 120-60 | 2.5 | Polished | 10.5 | Unstable veils |
| 5 | P1 | 120-60 | 2.5 | Polished | 13.7 | Unstable veils |
| 6 | P1 | 70 | 3 | Grained | 8.0 | Light silver veils |
| 7 | P1 | 120-60 | 3 | Grained | 8.0 | Good surface |
| 8 | P2 | 110 | 3 | Grained | 7.2 | Good surface |
| 9 | P2 | 120-60 | 3 | Grained | 7.2 | Good surface |

The standard tool (mold) with 2.5 mm wall thickness and a polished surface was used for Terblend N NM21 EF and Novodur HH106. As the results were promising, but not acceptable for a 'Class A' surface on a polished part, another mold with a grained surface having four grains on one mold and 3 mm wall thickness has been used for the further samples as well as for ASA.

Surprisingly it was found that good surface quality can be achieved for grained structures using ASA (Luran® S) along with approximate 10% density reduction and with ABS/PA (Terblend® N) along with approximate 8% density reduction.

The invention claimed is:

1. A process for producing a foam molded part by foam injection molding, which comprises the following steps:
   a) providing a melt of a foamable material S comprising a thermoplastic polymer matrix M and at least one foaming agent F selected from chemical foaming agents releasing carbon dioxide and physical foaming agents selected from nitrogen and carbon dioxide, wherein the thermoplastic polymer matrix M comprises at least one thermoplastic styrene copolymer P consisting of, based on P:

1.1 5-95% by weight of a copolymer A consisting of, based on A:

1.1.1 70-76% by weight, of one or more vinyl aromatic monomer(s) A1 selected from styrene and substituted styrenes, 1.1.2 24-30% by weight, of one or more vinyl cyanide monomer(s) A2 selected from acrylonitrile, methacrylonitrile, or mixtures thereof, and 1.1.3 0-6% by weight, of one or more unsaturated copolymerizable monomers A3, 1.2 5-60% by weight of a graft rubber B consisting of, based on B:

1.2.1 10-95% by weight of a graft base B1 comprising, based on B1:

1.2.1.1 80-100% by weight of one or more rubber type monomer(s) B11 selected from butadiene, isoprene, and $C_1$-$C_{10}$ alkyl acrylates, and 1.2.1.2 0-20% by weight of one or more polyfunctional crosslinking monomer(s) B12, and 1.2.2 5-90% by weight of a graft shell B2 comprising, based on B2:

1.2.2.1 75-85% by weight of one or more vinyl aromatic monomer(s) B21 selected from styrene and substituted styrenes, 1.2.2.2 15-25% by weight of one or more vinyl cyanide monomer(s) B22 selected from acrylonitrile, methacrylonitrile, or mixtures thereof, and 1.2.2.3 0-10% by weight of one or more unsaturated copolymerizable monomers B23;

b) filling a mold cavity K with the melt of the foamable material S by injection;

c) foaming the foamable material S in the mold cavity K by reduction of pressure and/or increase in temperature;

d) taking out the foam molded part; and e) optionally further working of the foam molded part;

wherein the melt temperature shortly before or during injection of the melt into the mold cavity in step b) is in the range of 255° C. to 300° C., and wherein the mold temperature in step b) is in the range of 50° C. to 150° C., and wherein filling of the mold cavity K with the melt of the foamable material S by injection in step b) is carried out with an injection speed in the range of 100 to 200 ccm/s.

2. The process according to claim 1, wherein the foamable material S comprises as further additive one or more additives selected from fillers, plasticizers, impact modifiers, dyes, pigments, colorants, flame retardants, antistatic agents, mold-release agents, antioxidants, stabilizers, and lubricants.

3. The process according to claim 1, wherein the vinyl aromatic monomer(s) A1 and/or B21 are selected from styrene, substituted styrenes of the formula I:

wherein:
R is $C_1$-$C_8$-alkyl or hydrogen,
$R^1$ is $C_1$-$C_8$-alkyl or hydrogen,
with the provision that not both R and $R^1$ are hydrogen, and
n is 1, 2, or 3,
and mixtures of these compounds.

4. The process according to claim 1, wherein the thermoplastic polymer matrix M consists of a blend of at least one thermoplastic styrene copolymer P and at least one further polymer selected from polycarbonates and polyamides.

5. The process according to claim 1, wherein the foamable material S comprises at least 0.1% by weight, based on the foamable material S, of a chemical foaming agent comprising bicarbonate and citric acid as sole foaming agent.

6. The process according to claim 1, wherein the melt temperature shortly before or during injection of the melt into the mold cavity in step b) is equal or higher than 270° C., and wherein the mold temperature in step b) is equal or higher than 70° C.

7. The process according to claim 1, wherein the melt temperature shortly before or during injection of the melt into the mold cavity in step b) is in the range of 265° C. to 290° C., and wherein the mold temperature in step b) is in the range of 50° C. to 100° C.

8. The process according to claim 1, wherein filing of the mold cavity K with the melt of the foamable material S by injection in step b) is carried out with an injection speed in the range of 150 to 180 ccm/s.

9. The process according to claim 1, wherein the mold cavity K exhibits a polished surface or a grained surface having grain domains of at least 10 μm.

10. The process according to claim 1, wherein the thermoplastic polymer matrix M consists of at least one polymer selected from acrylonitrile-butadiene-styrene copolymers, acrylonitrile-styrene-acrylate copolymers, and blends of said styrene copolymers with at least one polyamide.

11. The process according to claim 1, wherein the foaming in step c) is carried out by reduction of pressure and wherein the reduction of pressure and the foaming is performed together with the injection step b).

12. The process according to claim 1, wherein the foaming of the foamable material S in step c) results in a density reduction in the range of 5 to 20%.

13. The process according to claim 1, wherein the thermoplastic polymer matrix M consists of acrylonitrile-butadiene-styrene copolymers, acrylonitrile-styrene-acrylate copolymers, or blends of acrylonitrile-butadiene-styrene copolymer and at least one polyamide, wherein the melt temperature shortly before or during injection of the melt into the mold cavity in step b) is in the range of 265° C. to 290° C.; wherein the mold temperature in step b) is in the range of 70 to 90° C.; and wherein the foaming of the foamable material S in step c) results in a density reduction in the range of 7 to 18%.

* * * * *